United States Patent [19]

Longobardi et al.

[11] Patent Number: 5,229,232
[45] Date of Patent: Jul. 20, 1993

[54] METHOD OF MAKING THERMALLY-TRANSFERRED COLOR FILTER ARRAYS WITH INCORPORATED BLACK MATRIX USING ELECTRONIC LIGHT FLASH

[75] Inventors: Carmen J. Longobardi, Rochester; Helmut Weber, Webster; Michael E. Long, Penfield, all of N.Y.

[73] Assignee: Eastman Kodak Company, Rochester, N.Y.

[21] Appl. No.: 740,231

[22] Filed: Aug. 5, 1991

[51] Int. Cl.⁵ .................................................. G03C 5/00
[52] U.S. Cl. ........................................ 430/7; 430/321; 430/322; 430/416; 503/227; 359/885
[58] Field of Search .............. 430/5, 7, 321, 322, 430/416; 503/227; 350/311; 427/261, 265

[56] References Cited

U.S. PATENT DOCUMENTS 4,923,860  5/1990  Simons ................................ 430/7
5,077,155  12/1991  Simons ................................ 430/7

Primary Examiner—Marion E. McCamish
Assistant Examiner—S. Rosasco
Attorney, Agent, or Firm—Raymond L. Owens

[57] ABSTRACT

A thermal printing system is disclosed in which various patterned masks are used in conjunction with an electronic light flash and other related hardware to thermally transfer dyes to a receiver in such a way as to create a color filter array with an incorporated black matrix for use in a color liquid crystal display device.

4 Claims, 10 Drawing Sheets

METHOD OF MAKING THERMALLY-TRANSFERRED COLOR FILTER ARRAYS WITH INCORPORATED BLACK MATRIX USING ELECTRONIC LIGHT FLASH

This invention relates to a method for making color filter array elements by thermal dye transfer for use in color liquid crystal display devices.

In recent years, thermal transfer systems have been developed to obtain prints from pictures which have been generated electronically from a color video camera. According to one way of obtaining such prints, an electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye-donor element is placed face-to-face with a dye-receiving element. The two are then inserted between a thermal printing head and platen roller. A line-type thermal printing head is used to apply heat from the back of the dye-donor sheet. The thermal printing head has many heating elements and is heated up sequentially in response to the cyan, magenta and yellow signals. The process is then repeated for the other two colors. A color hard copy is thus obtained which corresponds to the original picture viewed on a screen. Further details of this process and an apparatus for carrying it out are contained in U.S. Pat. No. 4,621,271 by Brownstein entitled "Apparatus and Method For Controlling a Thermal Printer Apparatus", issued Nov. 4, 1986, the disclosure of which is hereby incorporated by reference.

Another way to thermally obtain a print using the electronic signals described above is to use a laser instead of a thermal printing head. In such a system, the donor sheet includes a material which strongly absorbs at the wavelength of the laser. When the donor is irradiated, this absorbing material converts light energy to thermal energy and transfers the heat to the dye in the immediate vicinity, thereby heating the dye to its vaporization temperature for transfer to the receiver. The absorbing material may be present in a layer beneath the dye and/or it may be admixed with the dye. The laser beam is modulated by electronic signals which are representative of the shape and color of the original image, so that each dye is heated to cause volatilization only in those areas in which its presence is required on the receiver to reconstruct the color of the original object. Further details of this process are found in GB No. 2,083,726A, the disclosure of which is hereby incorporated by reference.

Liquid crystal display devices are known for digital display in electronic calculators, clocks, household appliances, audio equipment, etc. There has been a need to incorporate a color display capability into such monochrome display devices, particularly in such applications as peripheral terminals using various kinds of equipment involving phototube display, mounted electronic display, or TV-image display. Various attempts have been made to incorporate a color display using a color filter array element into these devices. However, none of the color array elements for liquid crystal display devices so far proposed have been successful in meeting all the user's needs.

One commercially-available type of color filter array element which has been used in liquid crystal display devices for color display capability is a transparent support having a gelatin layer thereon which contains dyes having the additive primary colors red, green and blue in a mosaic pattern obtained by using a photolithographic technique. To prepare such a color filter array element, a gelatin layer is sensitized, exposed to a mask for one of the colors of the mosaic pattern, developed to harden the gelatin in the exposed areas, and washed to remove the unexposed (uncrosslinked) gelatin, thus producing a pattern of gelatin which is then dyed with dye of the desired color. The element is then recoated and the above steps are repeated to obtain the other two colors. This method contains many labor-intensive steps, requires careful alignment, is time consuming and very costly. Further details of this process are disclosed in U.S. Pat. No. 4,081,277. U.S. Pat. No.4,786,148 also discloses a color filter array element which employs certain pigments.

In addition, a color filter array element to be used in a liquid crystal display device may have to undergo rather severe heating and treatment steps during manufacture. For example, a transparent conducting layer, such as indium tin oxide, is usually vacuum sputtered onto the color filter array element and then cured. This may take place at temperatures elevated as high as 200° C. for times which may be as long as one hour or more. This is followed by coating with a thin polymeric alignment layer for the liquid crystals, such as a polyimide. Regardless of the alignment layer used, the surface finish of this layer in contact with the liquid crystals is very important and may require rubbing or may require curing for up to several hours at an elevated temperature. These treatment steps can be very harmful to many color filter array elements, especially those with a gelatin matrix.

Opaque grid lines are normally used in these color filter array elements to separate the mosaic elements (pixels) or color patches from each other, and to prevent color contamination or light flare. Grid lines are made in a prior art method by evaporating chromium oxide onto the substrate through a photolithographic mask which defines the grid pattern. This method, similar to that used in commercially-available color filter array elements, contains many labor-intensive steps, requires careful alignment, is time-consuming and very costly.

SUMMARY OF THE INVENTION

It is an object of this invention to provide an improved method of forming opaque grid lines for color filter arrays.

Another object is to provide a high quality color filter array element having good sharpness and which can be obtained easily and at a lower price than those of the prior art.

A still further object is to provide a color filter array element which will be able to withstand the heating and treatment steps employed in making a liquid crystal display device This object is achieved in a process for preparing a color filter array element for use in making a color liquid crystal display or the like, comprising the steps of:

(a) moving a first color patch on a dye-donor element of a dye-donor element having a repeating series of different color patches to be in contact with a mask having a predetermined pattern of openings;

(b) positioning a dye-receiver element in dye receiving relation to the openings;

(c) image wise heating the dye-donor element . by means of an electronic controlled light flash to cause the dye of the first color to transfer in the areas corresponding to the clear openings to provide a first repeating mosaic pattern of the first color filter in the dye receiving element;

(d) repositioning the mask to a different position and moving a second color patch of the dye-donor element into contact with the mask and repeating step (c) to provide a second repeating mosaic pattern of the second color filters in the dye-receiving element with portions of the first and second colors between the first and second mosaic filters overlapping to provide grid lines.

(e) repositioning the mask to a different position and moving a third color patch of the dye-donor element into contact with the mask and repeating step (c) to provide a third repeating mosaic pattern of the third color filter in the dye-receiving element with portions of the first, second and third colors between the three mosaic filters overlapping to complete the grid lines.

DETAILED DESCRIPTION OF THE PREFERRED EMBODIMENT

Figure 1:
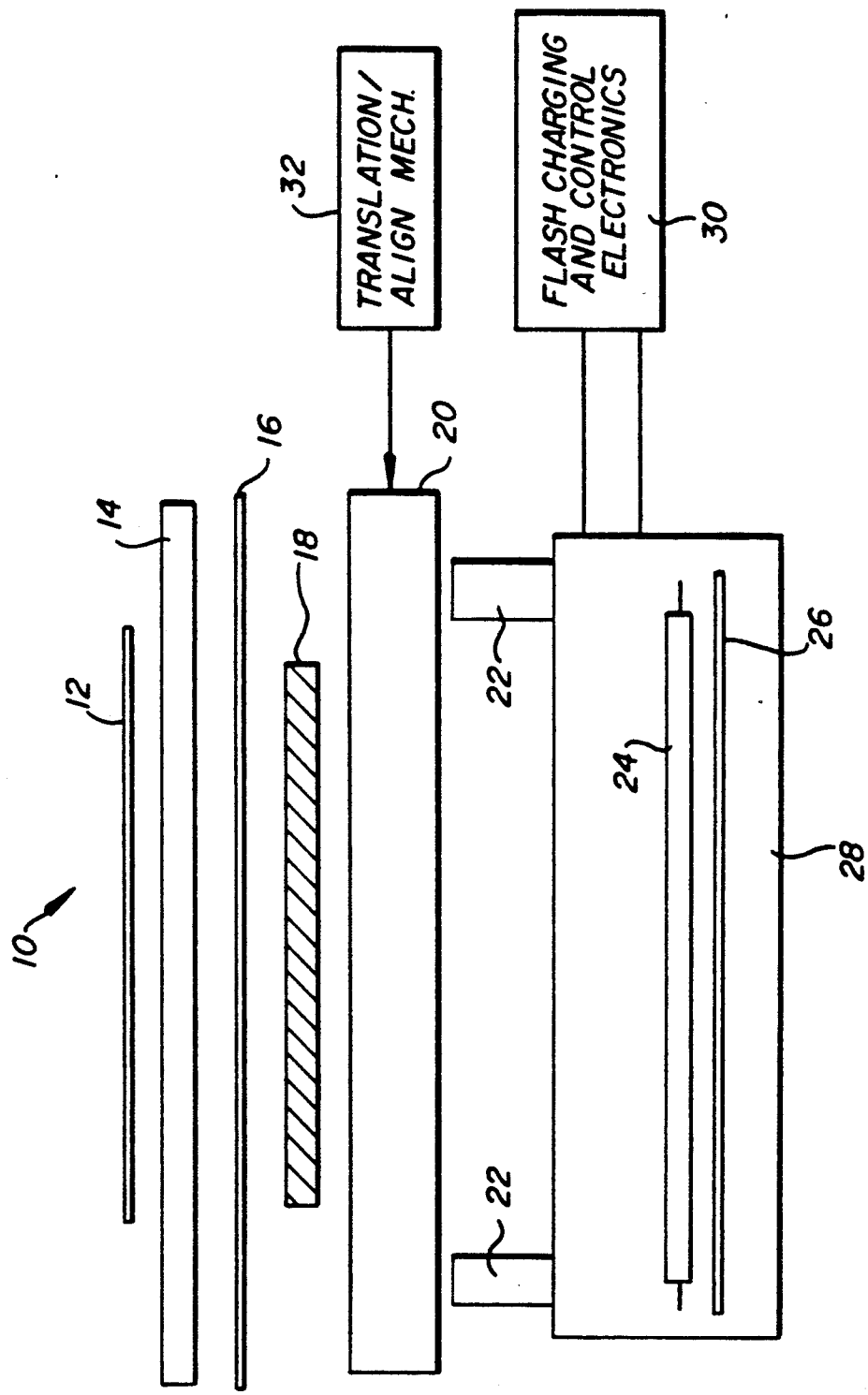
FIG. 1 is a schematic partially in cross-section of a flash thermal printing apparatus which transfers a dye image to a receiver in accordance with the invention.
Figure 3:
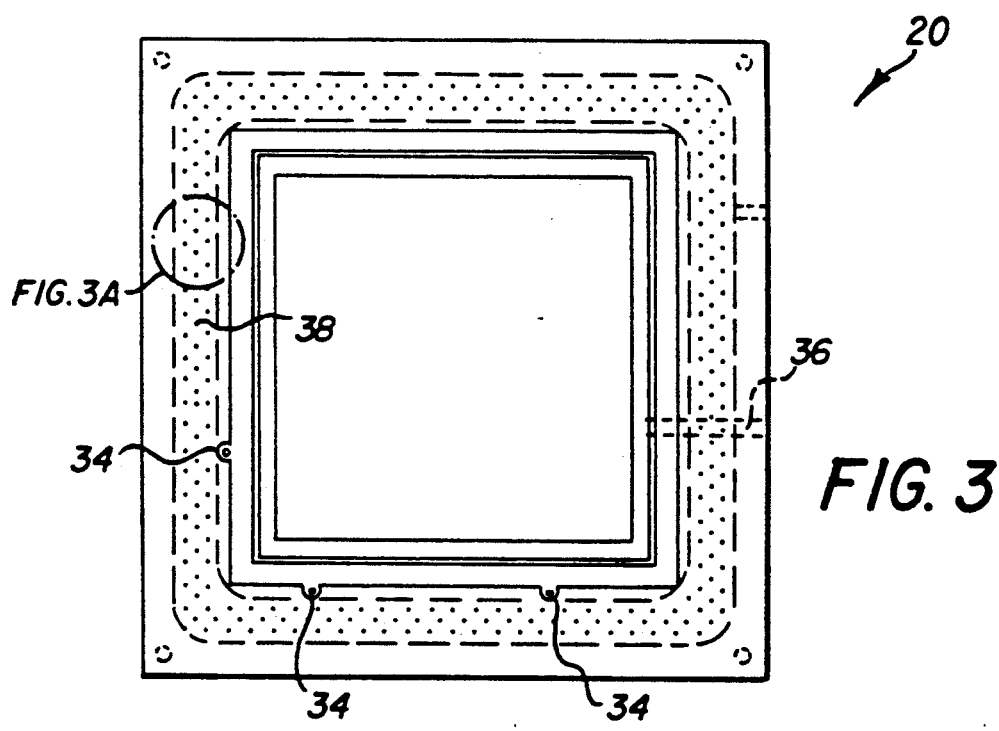
FIG. 3 is an exploded portion of FIG. 1 showing the vacuum fixture in detail.
Figure 3A:
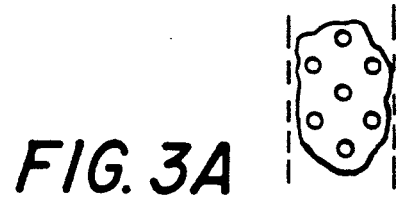
FIG. 3A is an exploded portion of FIG. 3 showing the vacuum holes 38.

As shown in FIG. 1, a printer apparatus 10 includes a white backing layer 12, a dye receiver element 14, a dye-donor element 16, a mask 18, a vacuum fixture 20 and spacers 22. The apparatus further includes an electronic light flash 28 controlled by a flash charging and control electronics 30. The spacers 22 or some other positioning device achieve the proper distance required between the mask 18, and the flash lamp 24. The mask 18 is positioned in the vacuum fixture 20 and referenced to three alignment pins 34 held within the fixture 20, as shown in FIG. 3. A vacuum is applied to the fixture 20 through an access port 36 to retain the mask 18 in position. The vacuum fixture 20 is positioned laterally by a translation and alignment mechanism 32. The dye-donor element 16 is overlayed on the mask 18 and vacuum fixture 20 with the support side of the donor element 16 held against the mask 18 and positioned so that it covers a series of small vacuum holes 38 in the vacuum fixture 20 such that when a vacuum is applied through the small holes 38, the donor 16 is held in vacuum against the patterned surface of the mask 18. Preferably the donor element is driven along a path from a supply roller to a take-up roller, not shown, and is held under tension while the vacuum is applied to avoid wrinkles and air gaps from occurring between the donor 16 and mask 18. Media transport mechanisms are well known to those in the field. It is also preferable that the process be done in a clean environment to eliminate dust or dirt particles from the donor 16 to mask 18 vacuum interface, as well as from the donor 16 to receiver 14 interface.

The receiver element 14 is then brought into close proximity to the dye-coated side of the donor element 16 such that an approximate 10 micron gap +/−5 microns exists. This gap can be controlled through the . use of an interferometer or group of interferometers, linear transducer/detectors, stepper-motors, and/or optical measurement and positioning systems well known to those in the field.

The electronic light flash 28 is charged by means of the charging and control electronics 30 which determine the energy output of flash lamp 24. The flash lamp 24 and the reflector 26 are designed so as to produce a near-collimated light output, and the thickness of the spacers 22 are determined from energy measurements made at the mask-to-donor interface plane to achieve the optimum dye transfer. The diffuse white backing layer 12 is positioned behind the receiver element 14 to provide a uniform background.

The flash lamp 24 is discharged causing imagewise dye transfer to occur in the transparent areas of the mask 18 from the dye-donor element 16 to the dye-receiver element 14. The vacuum is then removed from the donor element 16. The translation/alignment mechanism 32 positions the mask with respect to the image now on the receiver 14. A new donor color patch is then brought into contact for the next dye transfer. The process is repeated again until all three colors are imaged on the dye-receiver element 14. The resultant image is dependent on the mask or masks being used in the above transfer process.

The permanent support employed in the invention can be any transparent material such as a polycarbonate, polyethylene terephthalate, cellulose acetate, polystyrene, etc. In a preferred embodiment the permanent support is glass.

In another preferred embodiment of the invention the mosaic pattern consists of a set of red, green and blue additive primaries.

Each area of primary color and each set of primary colors are separated from each other by an opaque area, e.g. black grid lines. This has been found to give improved color reproduction and reduce flare in the displayed image.

The size of the mosaic set is not critical since it depends on the viewing distance. In general, the individual pixels (mosaic elements) of the set are from about 50 to about 600 μm and do not have to be of the same size.

Figure 2:
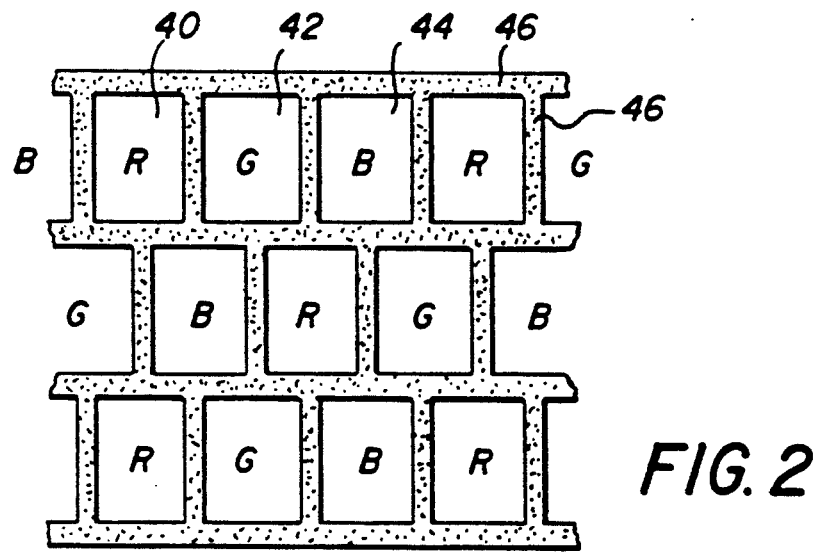
FIG. 2 shows a desired mosaic pattern of red (R), green (G), and blue (B), dye elements of a color filter array.

In a preferred embodiment of the invention, the repeating mosaic pattern of dye elements to form the color filter array element consists of uniform, square, linear repeating areas, with one color diagonal displacement as shown in FIG. 2. The color pixel elements of the color filter array are arranged in a repeating pattern of red (R) 40, green (G) 42, and blue (B) 44, with each individual color pixel surrounded by the black matrix grid lines 46.

In another preferred embodiment, the above areas are approximately 12000 $\mu m^2$.

As noted above, the color filter array elements of the invention are used in various display devices such as a liquid crystal display device. Such liquid crystal display devices are described, for example, in UK Patent Nos. 2,154,355; 2,130,781; 2,162,674 and 2,161,971.

The dye image receiving layer used in forming the color filter array element of the invention may comprise, for example, polymers such as a polycarbonate, a polyurethane, a polyester, a polyvinyl chloride, a polyamide, a polystyrene, an acrylonitrile, a polycaprolactone or mixtures thereof. This layer may be present in any amount which is effective for the intended purpose. In general, good results have been obtained at a coverage of from about 0.25 to about 5 g/m². In a preferred embodiment, polycarbonates have a $T_g$ greater than about 200° C. as disclosed in U.S. patent application Ser. No. 4,962,081, filed Apr. 6, 1989 of Harrison et al. are employed.

A dye-donor element that is used to form the color filter array element of the invention comprises a support having thereon a dye layer. Any dye or mixture of dyes can be used in such a layer provided they are transferrable to the dye image-receiving layer of the color array element of the invention by the action of heat. Especially good results have been obtained with sublimable dyes. Examples of sublimable dyes include anthraquione dyes, e.g. Sumikalon Violet RS ®️ (Sumitomo Chemical Co., Ltd.), Dianix Fast Violet 3R FS ®️ (Mitsubishi Chemical Industries, Ltd.), and Kayalon Polyol Brilliant Blue N-BGM ®️ and KST Black 146 ®️ (Nippon Kayaku Co., Ltd.); azo dyes such as Kayalon Polyol Brilliant Blue BM ®️, Kayalon Polyol Dark Blue 2BM ®️, and KST Black KR ®️ (Nippon Kayaku Co., Ltd.), Sumickaron Diazo Black 5GH ®️ (Mitsui Toatsu Chemicals, Incl); direct dyes such as Direct Green B ®️ (Mitsubishi Chemical Industries, Ltd.) and Direct Brown M ®️ and Direct Fast Black D ®️ (Nippon Kayaku Co. Ltd); acid dyes such as Kayanol Milling Cyanine 5R ®️ (Nippon Kayaku Co. Ltd); basic dyes such as Sumiacryl Blue 6G ®️ (Sumitomo Chemical Co., Ltd. and Aizen Malachite Green ®️ (Hodogays Chemical Co., Ltd.);

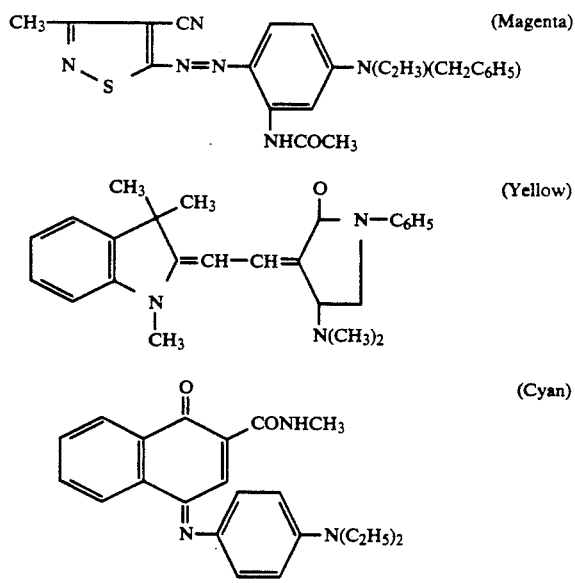

The present invention is suitable for use in wax transfer systems in which dye is contained in a wax matrix. When the wax is heated, it melts and an image pixel is transferred to the receiver. However, sublimable dyes are preferable.

The dye in the dye-donor element is preferably dispersed in a polymeric binder such as a cellulose derivative, e.g., cellulose acetate hydrogen phthalate, cellulose acetate, cellulose acetate propionate, cellulose acetate butyrate, cellulose atriacetate; a polycarbonate; poly(styrene-coacrylonitrile), a poly(sulfone) or a poly(phenylene oxide). The binder may be used at a cover of from about 0.1 to about 5 g/m².

The dye layer of the dye-donor element may be coated on the support or printed thereon by a printing technique such as a gravure process.

Consequently, separate rolls for each color of the dye-donor element may be coated, or all three colors may be patch-coated onto the same roll.

Any material can be used as the support for the dye-donor element provided it is dimensionally stable and can withstand the heat of the thermal printing process. Such materials include polyesters such as poly(ethylene terephthalate); polyamides; polycarbonates; glassine paper; condenser paper; cellulose esters; fluorine polymers; polyethers; polyacetals; polyolefins; and polyimides. The support generally has a thickness of from about 10 to 50 microns. It may also be coated with a subbing layer, if desired.

As described in the prior art, various methods may be used to transfer dye from the dye-donor element to the transparent support to form the color filter array element of the invention. There may be used, for example, imagewise-heating by means of a laser using a dye-donor element, comprising a support having thereon a dye layer and an absorbing material for the laser, said imagewise-heating being done in such a way as to produce a repeating mosaic pattern of colorants.

Any material that absorbs the laser energy may be used as the absorbing materials described above for the laser such as carbon black or non-volatile infrared-absorbing dyes or pigments which are well known to those skilled in the art. Cyanine infrared absorbing dyes may also be employed with infrared diode lasers as described in DeBoer U.S. Pat. No. 4,973,572 filed Jun. 9, 1989, the disclosure of which is hereby incorporated by reference.

Another method of transferring dye from the dye donor to the transparent support to form the color filter array element of the invention is to use a heated embossed roller as described more fully in commonly assigned U.S. Pat. No. 4,978,652 by Simons entitled "Method of Making a Color Filter Array Using a Heated Embossed Surface", filed Sep. 18, 1989.

In accordance with the invention mask 18 produces a color filter array element by thermal-dye transfer exclusive of photolithographic processes. Disclosed are three mask designs, which when used in any of three preferred embodiments will produce a color filter array pattern including black grid lines created by dye-overlap of various combinations of the additive primaries red, green and blue. By utilizing the dye-overlap method, the need for a separate negative grid-pattern mask to thermally transfer black dye to form the black grid lines is eliminated, as well as the additional alignment and flash steps. The dye-overlap and said thermal-dye transfer processes are less costly and much less labor intensive than the typical photolithographic methods employed in prior art.

Figure 4:
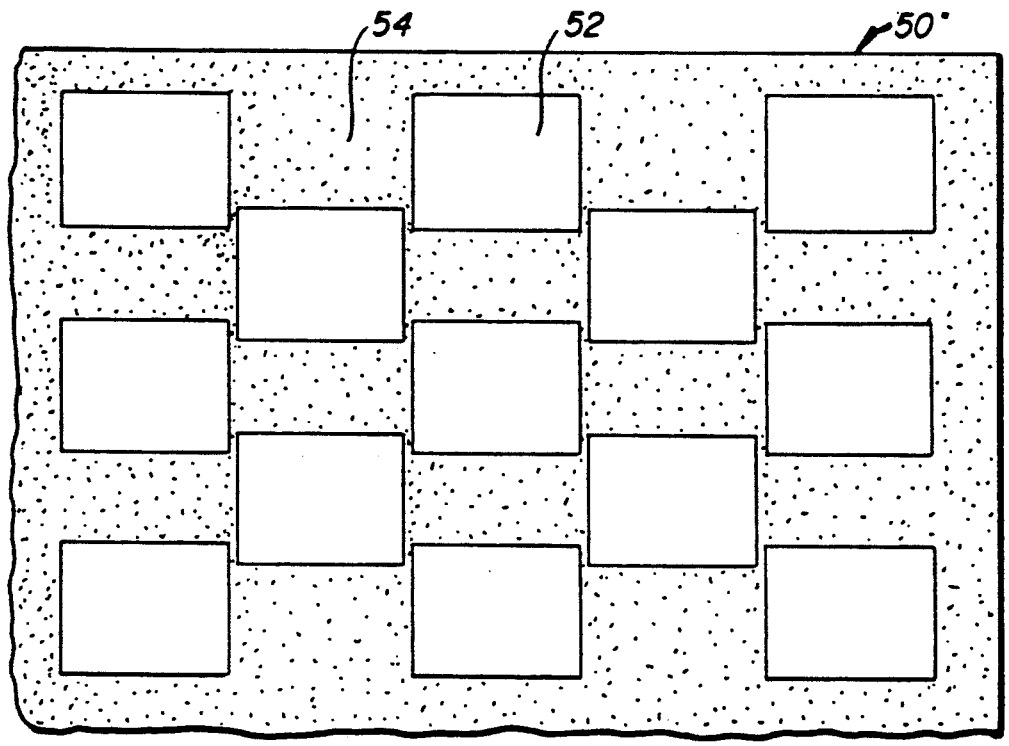
FIG. 4 is an expanded drawing of a portion of FIG. 1 showing the mask layout of a tri-color mask design.
Figure 7:
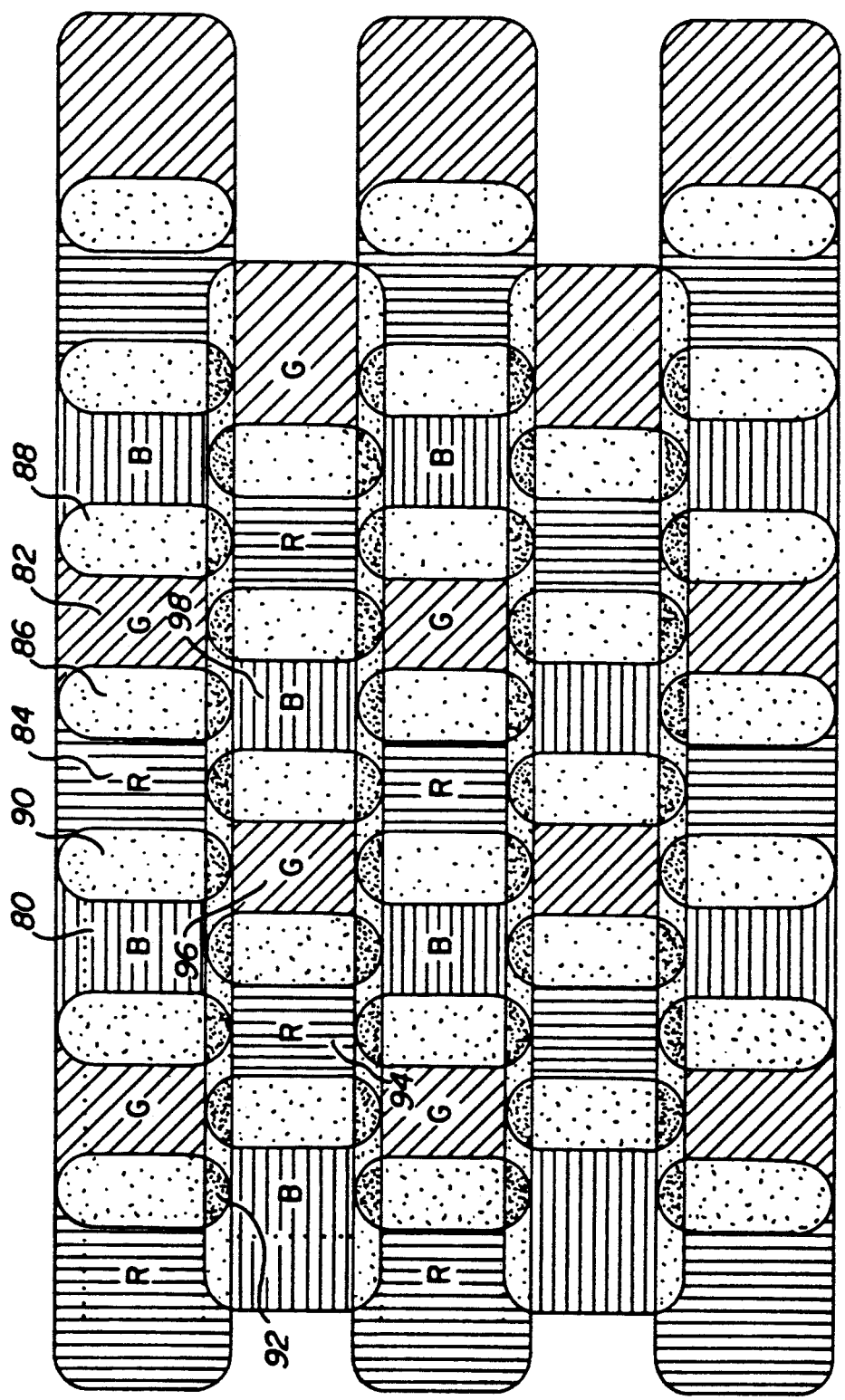
FIG. 7 shows the result of the dye transfer process after three successive flashes using the tri-color mask providing a completed mosaic pattern of the color filter array element with portions of the three colors overlapping to provide grid lines.

FIG. 4 shows the pattern layout for the Tri-color mask. The mask openings each have an area larger than the area of an individual color filter pixel. By imagewise heating from an electronic controlled light flash for each of the three color patches, and with mask translation between each flash, the red, green and blue dye colors are transferred to the dye-receiver in mosaic patterns. The additional dye area around each color filter pixel overlaps the adjacent dye areas to provide the black grid lines, as shown in FIG. 7. This is accomplished because the color dyes are additive colors, such that overlap of any two or more colors will make a black suitable for the black grid lines which surround the color filter pixels. With the Tri-color mask, four different color combinations or additions create black from the overlap of 1.) red and green 86, 2.) green and blue 88, 3.) blue and red 90, and 4.) red, green and blue 92 dyes in certain areas as indicated in the drawing in FIG. 7. A color filter pixel array with black grid lines is provided in this way as in FIG. 2. The same mask can be used for all three dye color transfers, with incremental offset and/or alignment between flashes, reducing the need for multiple masks which are quite costly.

Figure 5:
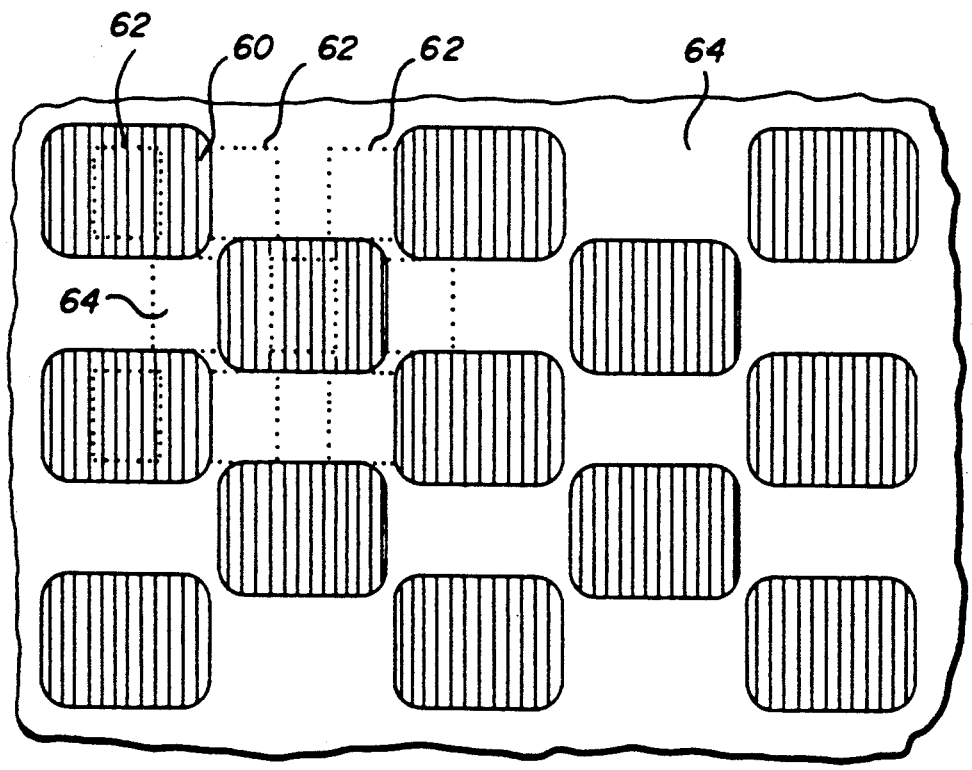
FIG. 5 shows the result of the dye transfer process after one flash using the tri-color mask providing the first color of the color filter array element.
Figure 6:
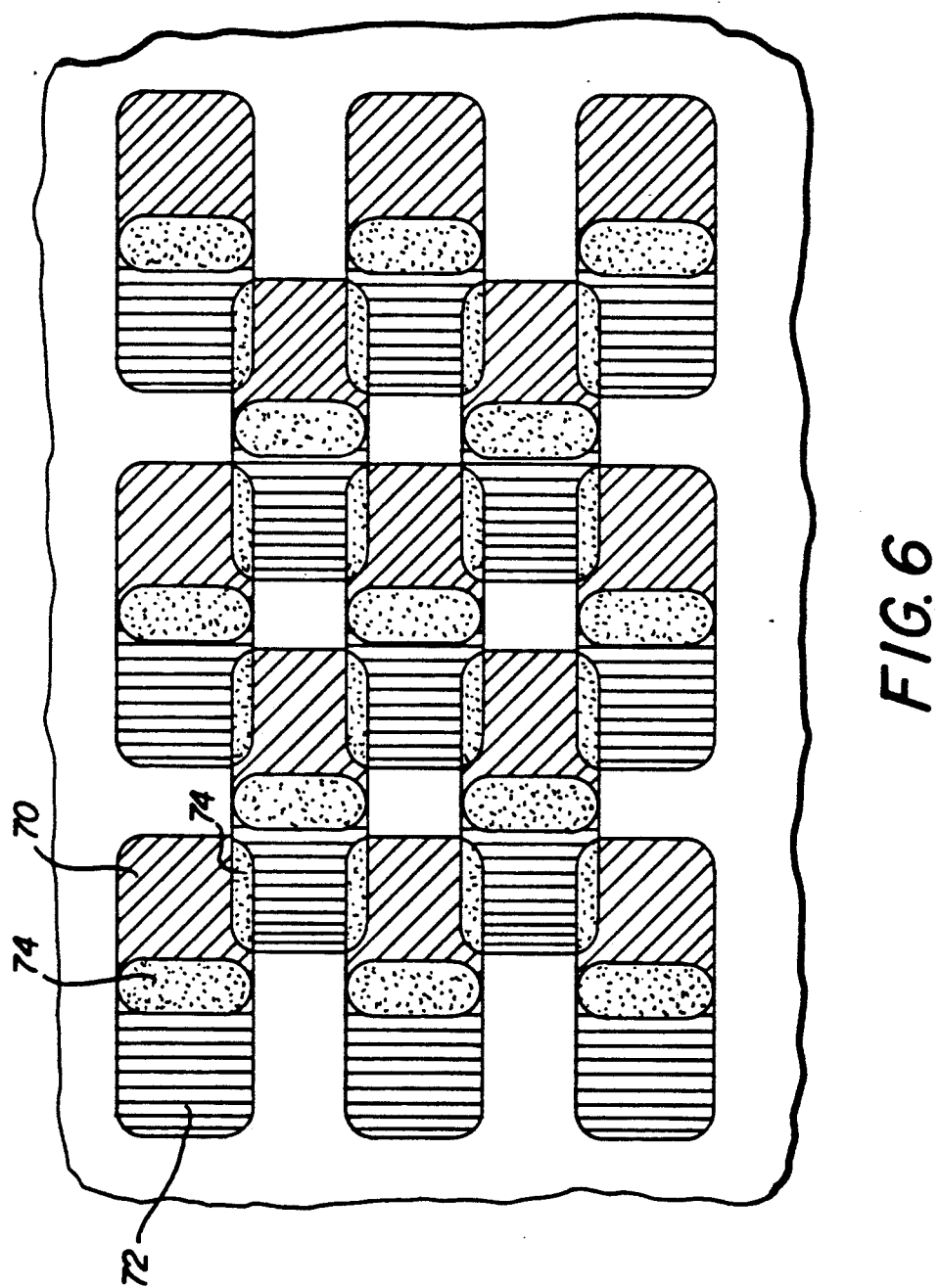
FIG. 6 shows the result of the dye transfer process after two successive flashes using the tri-color mask providing the first and second colors in a color filter array element with portions of these colors overlapping to provide grid lines.

EXAMPLE 1: FIG. 4 shows the mask pattern layout of a portion of the Tri-color mask 50 that could be used as in FIG. 1 for mask 18. Chromium oxide areas 54 are opaque to block light from the electronic controlled light flash 28 during the imagewise heating and dye transfer process. The clear areas 52 are openings in the chromium 54. More particularly, chromium oxide is deposited onto an appropriate glass substrate, such as quartz, and etched to provide the clear areas 52 in a repeating pattern as shown in FIG. 4. Mask making processes are well known to those experienced in the field. FIGS. 5, 6 and 7 show the resulting imagewise transfers from each of the three flashes. FIG. 5 shows red dye areas 60 that could be transferred to the dye-receiver element 14 from imagewise heating of the dye-donor element 16 by the electronic light flash 28 through the mask 18 when said mask 18 is the Tri-color mask 50. The dotted rectangular areas 62 show the desired final pixel dimension. The undyed areas 64 will be filled by subsequent flash thermal dye transfers. The mask 18 is then re-positioned laterally by the translation/alignment mechanism 32, and the next color patch of the dye-donor element 16 is brought into contact with the mask 18. The result of the second electronic light flash on the second color patch is shown in FIG. 6. A green dye area 70 as seen in FIG. 6 is shown offset from the red dye area 72 but overlapping in various areas 74 to begin to provide the grid lines 46 as shown in FIG. 2. The mask 18 is re-positioned as before, and the third color patch of the dye-donor element 16 is brought into contact with the mask 18. FIG. 7 simulates the color filter array pattern after the third and final thermal dye transfer by imagewise heating from the electronic light flash 28 through the mask 18. The blue dye area 80 as seen in FIG. 7 is shown offset from the green dye area 82 but overlapping the green dye 82 and also the adjacent red dye 84 such that the dye-receiving element 14 is completely dyed in the desired areas. The overlapping areas 86 of any two or more of the additive color dyes form the completed black matrix grid lines 46 as shown in FIG. 2. The red 94, green 96 and blue 98 color pixels in the repeating mosaic pattern make up the color filter array. The overlapping dye areas 86 provide the opaque grid lines. In a preferred embodiment, the dyes are then fused into the dye-receiver element 14 by exposure to a concentrated solvent vapor that softens the polymer sufficiently to allow the dyes to diffuse into the polymer. In another preferred embodiment, each dye is fused into the dye-receiver element 14 after each flash, then re-positioned and aligned for the next overlapping flash thermal dye transfer step. Further details of the fusing process are found in commonly assigned U.S. Pat. Nos. 5,143,754 and 5,162,291, both entitled Solvent Fusing of Thermal Printer Dye Image to Long and Van Galio, the disclosures of which are incorporated by reference herein.

Figure 8:
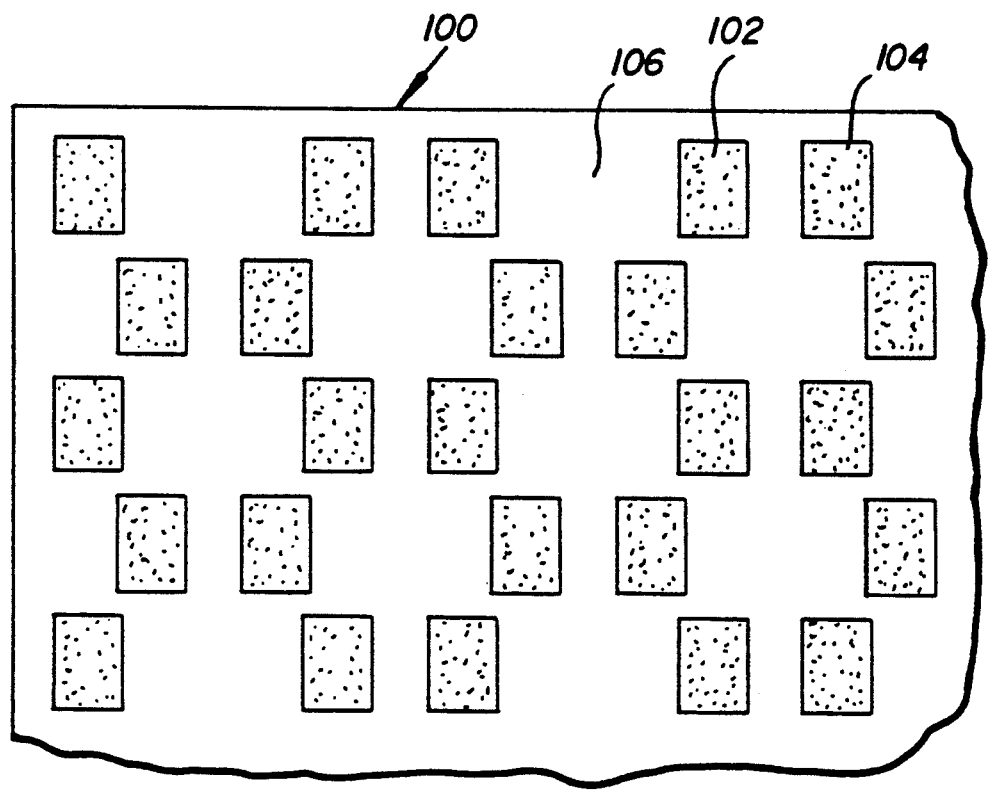
FIG. 8 is an expanded drawing of a portion of FIG. 1 showing the mask layout of a two-color mask design.
Figure 9:
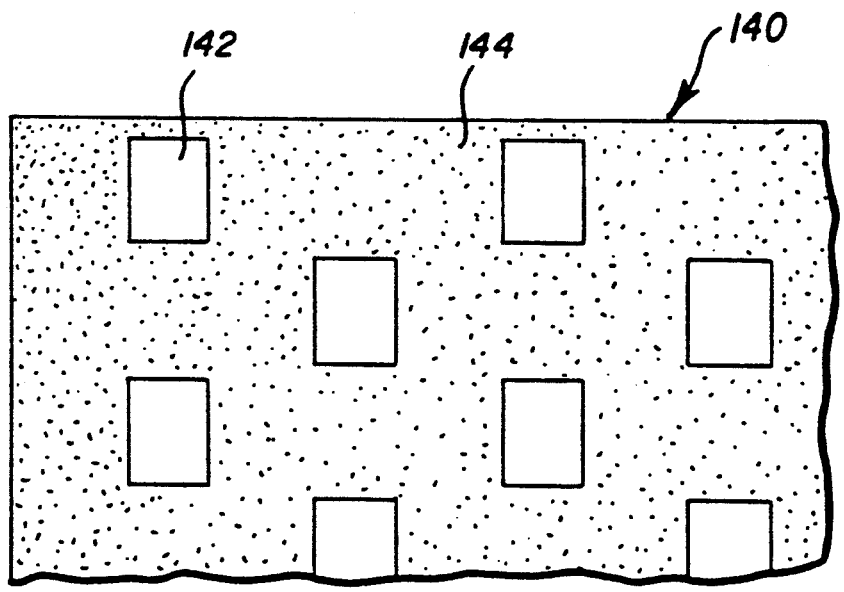
FIG. 9 is an expanded drawing of a portion of FIG. 1 showing the mask layout of a single-pixel-pattern mask design.

FIG. 8 shows the pattern layout for the Two-color mask. In one preferred embodiment, any two of the three additive primary dyes can be used to create the black grid lines uniformly from dye-overlap of red and green, green and blue, or blue and green dyes. By overlapping only two dyes, dye-loading of the dye-receiver element is reduced. One method requires a second single-pixel-pattern mask design as illustrated in FIG. 9, which would be used in the third flash transfer to fill-in the vacant pixel space in the color filter array image created from the first two flash transfers. Said first transfers may be any two of the three colors, and it is overlap of those two colors that create the black grid lines for the color filter array. In the preferred embodiment, red and blue dyes would be used to create the black grid lines.

Figure 10:
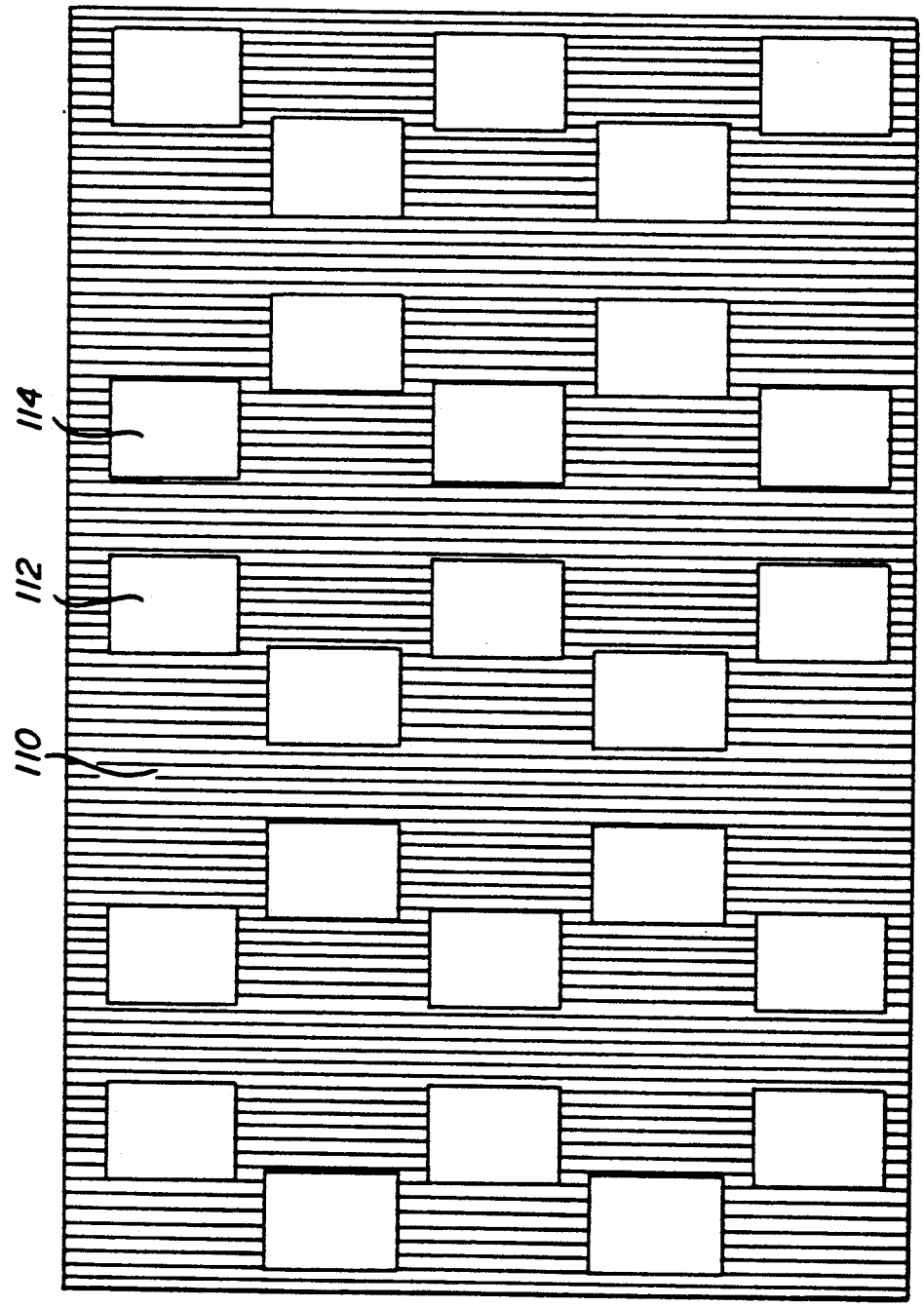
FIG. 10 shows the result of the dye transfer process after one flash using the two-color mask providing the first color of the color filter array element.
Figure 11:
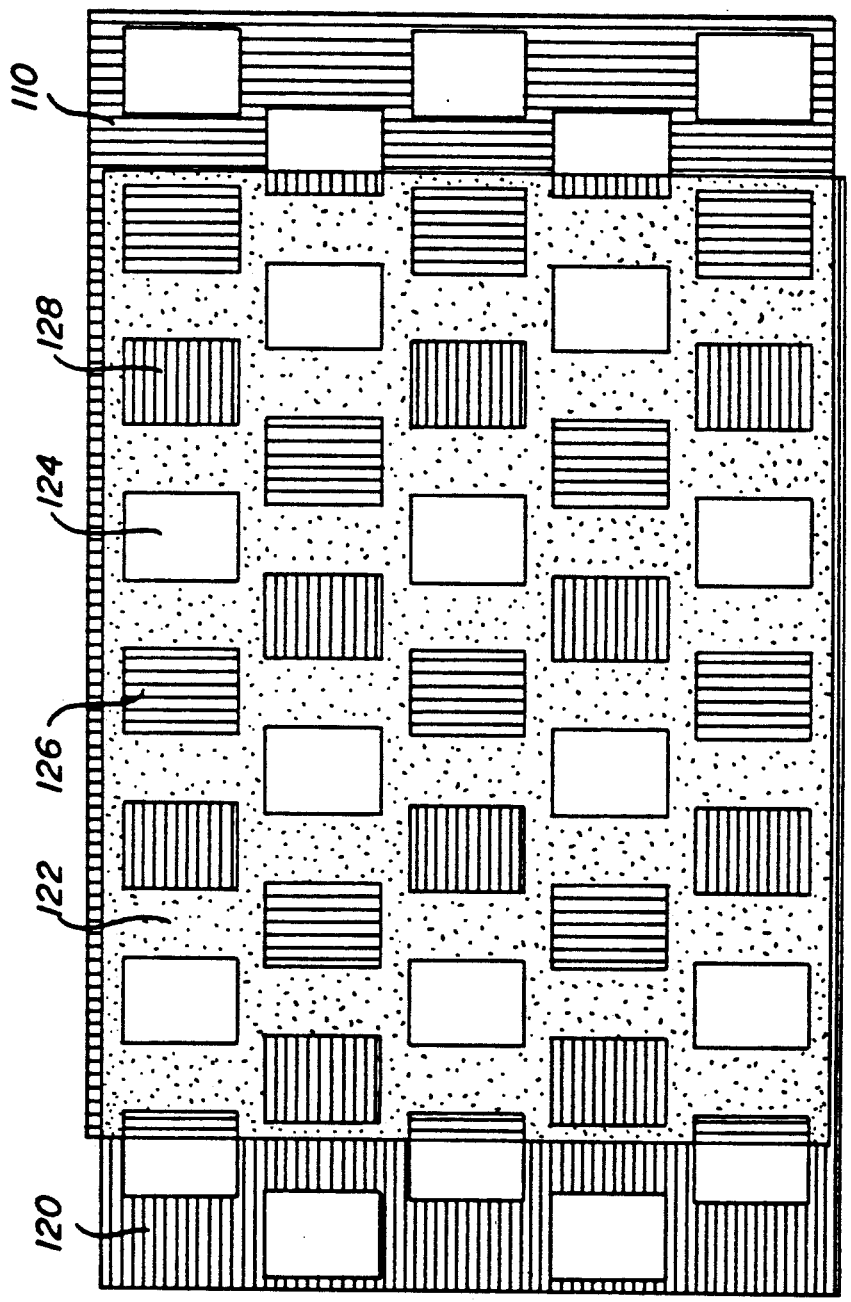
FIG. 11 shows the result of the dye transfer process after two successive flashes using the two-color mask providing the first and second colors in a color filter array element with portions of these colors overlapping to provide grid lines.
Figure 13:
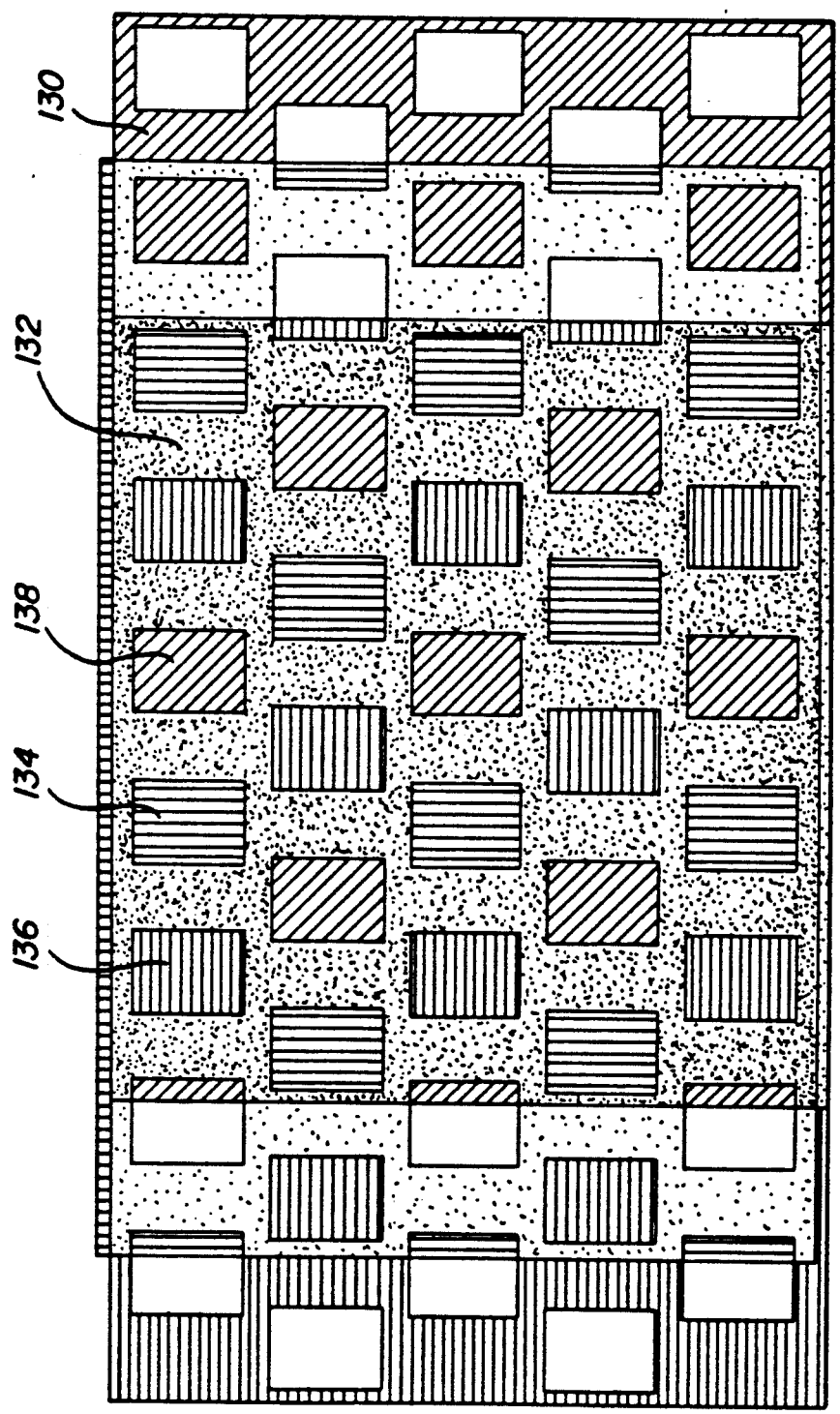
FIG. 13 shows the result of the dye transfer process after three successive flashes using the two-color mask providing a completed mosaic pattern of the color filter array element with portions of the three colors overlapping to provide grid lines.

EXAMPLE 2: FIG. 8 shows the mask pattern layout of a portion of the Two-color mask 100 that could be used in FIG. 1 for mask 18. The chromium oxide areas 102 and 104 are opaque to block light from the electronic light flash 28 during the imagewise heating and dye transfer process with the printer apparatus 10. The clear areas 106 are openings around the chromium pattern. The dye-receiver element 14 is positioned in dye receiving relation to the openings 106. Imagewise heating the dye-donor element 16 by means of an electronic controlled light flash 28 causes light to pass through the openings 106 to the first color dye patch causing pattern 110 as shown in FIG. 10. The undyed areas 112 and 114 correspond to the opaque areas 102 and 104 in the Two-color mask layout 100 of FIG. 8. The undyed areas 112 and 114 show the desired final pixel dimension. These undyed areas 112 and 114 will be filled by subsequent thermal dye transfers. The mask 18 is then re-positioned laterally by the translation/alignment mechanism 32, and the next color patch of the dye-donor element 16 is brought into contact with the mask 18. The mask is re-positioned laterally and in dye receiving relation to the dye-receiver element 14. Imagewise heating is repeated for the second color dye patch causing the second dye to transfer to the dye-receiver element 14 in a dyed pattern 120 which overlaps the previous dye pattern 110 in areas 122 as shown in FIG. 11 to provide the black grid lines 46. Since the dyes are additive, the grid lines 46 are completely formed after only two flashes with the Two-color mask 100 of FIG. 8. The undyed areas 124 corresponding to the third color of the color filter pixels will be filled by the third and final flash thermal dye transfer. The third color can be filled in one of two ways:

1.) Re-positioning the same Two-color mask 100 such that the opaque areas cover the previously dyed areas on the dye-receiver element 14 corresponding to the color filter pixels 126 and 128. Imagewise heating is repeated for the third color dye patch causing the third dye to transfer to the dye-receiver element 14 in a dyed pattern 130 as shown in FIG. 13. The third dye also overlaps the previous two dye patterns 110 and 120 in areas 132 to provide additional dye density or opacity to the black grid lines 46. The color filter array mosaic pattern is completed by the third flash, having color filter pixels red 134, blue 136 and green 138 surrounded by black matrix grid lines 132 as shown in FIG. 13 and resembling FIG. 2. With all three dye colors overlapped in areas 132 between the color filter pixels, maximum density or opacity is achieved by this method.

Figure 12:
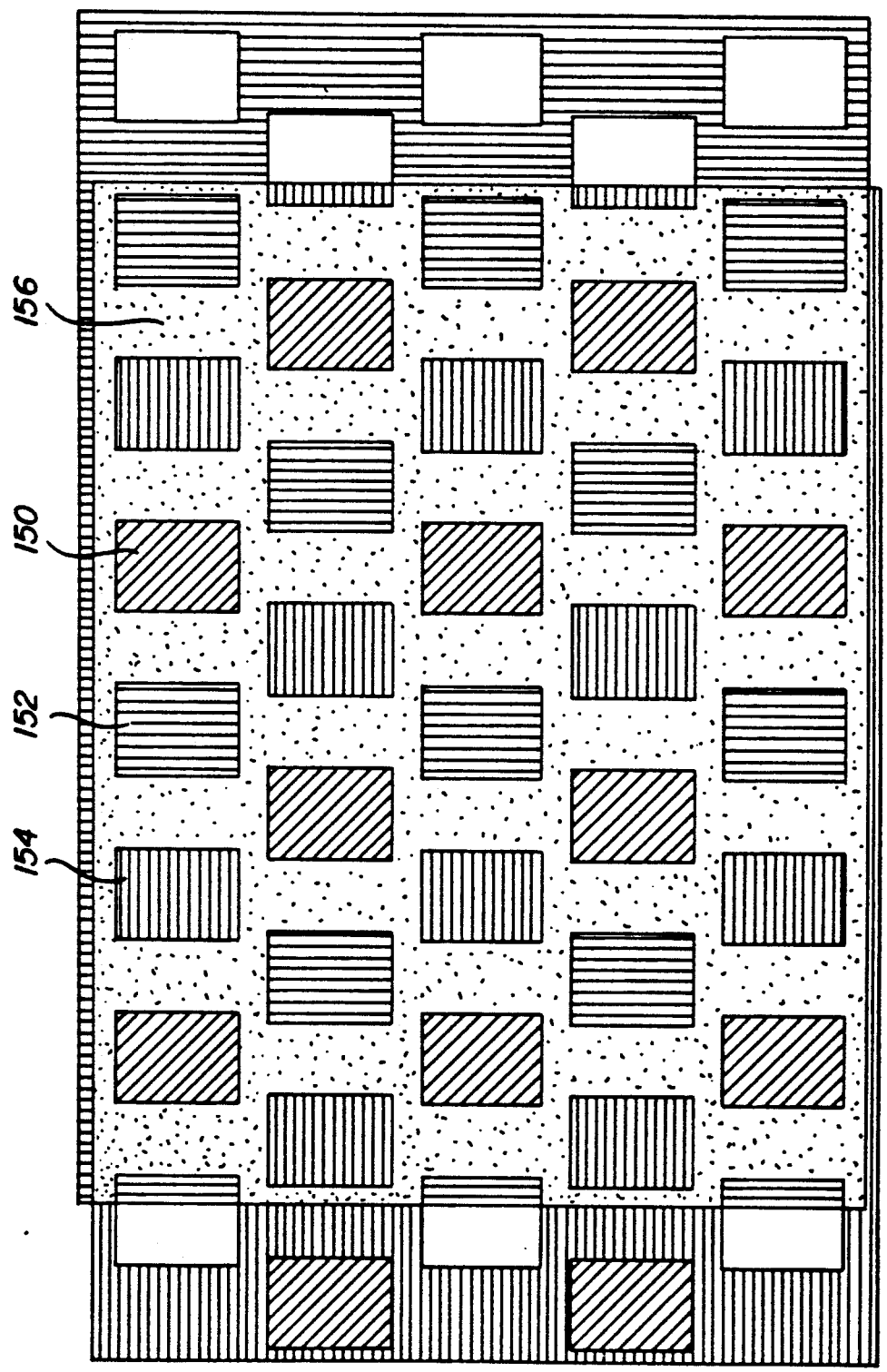
FIG. 12 shows the result of the dye transfer process after three successive flashes using the single-pixel-pattern mask providing the third color filter pixel to complete the mosaic pattern of the color filter array element.

2.) Positioning a single-pixel-pattern mask 140 as shown in FIG. 9 such that the clear areas 142 correspond to the undyed areas 124 in FIG. 11. The chromium areas 144 block light from reaching the third color patch in areas corresponding to the first and second color filter pixels and also in the areas corresponding to the black matrix grid lines 122. Imagewise heating of the third color dye patch is repeated causing the third dye to transfer only in the areas corresponding to the third color filter pixel 150 as shown in FIG. 12. The color filter array mosaic pattern is completed by the third flash having color filter pixels green 150, red 152 and blue 154 surrounded by black matrix grid lines 156 provided by overlap of the first and second color dye transfers as demonstrated previously in FIG. 11. Diffusion of the dyes into the dye-receiver element 14 is accomplished by the previously described fusing processes.

With the use of any mask, including those disclosed above, there will be image dimensional losses due to the dye-donor element support thickness, which is a variable that can be minimized but not eliminated. Diffraction of the light from the flash or other light sources occurs through the transparent support which reduces the transferred image size relative to the original clear mask areas. For this reason, all of the disclosed masks are compensated, providing dimensionally larger clear areas that allow for pixel shrinkage during the flash transfer process to result in the correctly dimensioned and spaced color array image. The preferred mask material is quartz glass which improves light energy transmission over many other mask substrates, such as soda-lime glass. Other image concerns, can also be compensated for, as shown in the simulation drawings of FIG. 5, FIG. 6, and FIG. 7 where a 40 degree radius was used to demonstrate that rounded corners, as may be seen in actual transferred images, can be tolerated by this mask design.

The invention has been described in detail with particular reference to certain preferred embodiments thereof, but it will be understood that variations and modifications can be effected within the spirit and scope of the invention.

We claim:

1. In a process for preparing a color filter pixel array element for use in making a color liquid crystal display or the like having grid lines, comprising the steps of:
    (a) moving a first color patch on a dye-donor element of a repeating series of different color patch to be in contact with a mask having a predetermined pattern of clear areas or openings;
    (b) positioning a dye-receiver element in dye receiving relation to the openings;
    (c) imagewise heating said dye-donor element by means of an electronic controlled light flash to cause light to pass through the openings to first color dye patch to provide a first repeating mosaic pattern of pixels of the first color filter in the dye receiving element;
    (d) repositioning the mask to a different position and moving a second color patch of the dye-donor element into contact with the mask and repeating step (c) to provide a second repeating mosaic pattern of pixels of the second color filters in the dye-receiving element with portions of the first and second colors between the first and second mosaic filters overlapping to provide grid lines; and
    (e) repositioning the mask to a different position and moving a third color patch of the dye-donor element into contact with the mask and repeating step (c) to provide a third repeating mosaic pattern of the third color filter in the dye-receiving element with portions of the first, second and third colors between the three mosaic filters overlapping to complete the grid lines.

2. The process of claim 1 wherein the mask has a repeating pattern of rectangular openings, each such opening having an area greater than the size of a pixel to thereby cause the grid lines.

3. In a process for preparing a color filter pixel array element having grid lines for use in a color liquid crystal display or the like, comprising:
    (a) moving a first color patch of a repeating series of different color patches into contact with a mask having opaque areas separated by openings, with adjacent opaque areas corresponding to different colored dye pixels;
    (b) positioning a dye receiver element in dye receiving relation to the mask;
    (c) imagewise heating a color patch by means of an electronic controlled light flash to cause light to pass through the openings to the colored dye patch, heating it and thereby causing the dye to transfer to the receiver in areas corresponding to the openings, leaving undyed the areas corresponding to the opaque areas;

(d) repositioning the mask to a different position wherein portions of the dye receiver area corresponding to pixels are covered by opaque areas, undyed portions are also covered by opaque areas and other undyed areas are covered by openings, and further moving the next color patch into contact with the mask;

(e) repeating step (c) to provide two separate colored pixel areas; and (f) repeating step (d) to complete a color filter pixel array of three different colors wherein portions between pixels are formed by overlapping dyed areas to provide grid lines.

4. In a process for preparing a color filter pixel array element having grid lines for use in a color liquid crystal display or the like, comprising:

(a) moving a first color patch of a repeating series of different color patches into contact with a mask having opaque areas separated by openings, with adjacent opaque areas corresponding to different colored dye pixels;

(b) positioning a dye-receiver element in dye receiving relation to the mask;

(c) imagewise heating a color patch by means of an electronic controlled light flash to cause light to pass through the openings to the first colored dye patch, heating it and thereby causing the dye to transfer to the receiver in the areas corresponding to the openings, leaving undyed the areas corresponding to the opaque areas;

(d) repositioning the mask to a different position wherein portions of the dye receiver area corresponding to pixels are covered by opaque areas, undyed portions are also covered by opaque areas and other undyed areas are covered by openings, and further moving the next color patch into contact with the mask;

(e) repeating steps (c) to provide two separate colored areas wherein two separate colored pixels of the color filter array are formed and wherein portions between pixels are formed by overlapping the two dyed areas to provide grid lines, leaving undyed a single-pixel pattern on the dye-receiver element; and (f) positioning another mask having openings which correspond to the third color pixel, and moving the next color patch into contact with the mask and repeating step (c) to complete a color filter array.

* * * * *

United States Patent Office
CERTIFICATE OF CORRECTION

Patent No. 5,229,232              Dated July 20, 1993

Inventor(s) Carmen J. Longobardi, Helmut Weber and Michael E. Long

It is certified that errors appear in the above-identified patent and that said Letters Patent is hereby corrected as shown below Col. 10, Claim 1, line 21, after "color" delete "patch" and insert --patches--.

Col. 12, Claim 4, line 1, after "the" (second occurrence), delete "first".

Signed and Sealed this

Twenty-sixth Day of April, 1994

Attest:

BRUCE LEHMAN

Attesting Officer                    Commissioner of Patents and Trademarks